United States Patent
Govekar et al.

(10) Patent No.: US 10,329,037 B2
(45) Date of Patent: Jun. 25, 2019

(54) APPARATUS AND METHOD FOR LOCKING A STORAGE TANK ABOVE A SCALE DURING TRANSPORTATION

(71) Applicant: Snap-on Incorporated, Kenosha, WI (US)

(72) Inventors: Craig F. Govekar, Gurnee, IL (US); Rahhali Sanhaji, Sesto Fiorentino (IT)

(73) Assignee: Snap-on Incorporated, Kenosha, WI (US)

( * ) Notice: Subject to any disclaimer, the term of this patent is extended or adjusted under 35 U.S.C. 154(b) by 60 days.

(21) Appl. No.: 15/820,058

(22) Filed: Nov. 21, 2017

(65) Prior Publication Data
US 2019/0039759 A1     Feb. 7, 2019

(30) Foreign Application Priority Data
Aug. 4, 2017    (IT) .......................... 102017000090844

(51) Int. Cl.
| | |
|---|---|
| *G01G 21/08* | (2006.01) |
| *B65B 1/46* | (2006.01) |
| *B65B 3/28* | (2006.01) |
| *F25B 45/00* | (2006.01) |

(52) U.S. Cl.
CPC .................. *B65B 1/46* (2013.01); *B65B 3/28* (2013.01); *F25B 45/00* (2013.01); *F25B 2345/007* (2013.01); *F25B 2345/0051* (2013.01); *F25B 2345/0052* (2013.01)

(58) Field of Classification Search
CPC ... B65B 1/46; B65B 3/28; F25B 45/00; F25B 2345/0051; F25B 2345/0052; F25B 2345/007; G01G 17/04; G01G 23/005; G01G 19/22; G01G 19/12; G01L 1/26; B62B 3/0625; B66F 7/0625; B66F 7/0641
See application file for complete search history.

(56) References Cited

U.S. PATENT DOCUMENTS

| | | | | |
|---|---|---|---|---|
| 2,358,770 | A | * | 9/1944 | Carliss ................. G01G 19/083 |
| | | | | 177/130 |
| 2,693,339 | A | * | 11/1954 | Quayle ................. B62B 3/0612 |
| | | | | 254/8 R |
| 4,625,944 | A | * | 12/1986 | Mankey .................... B60P 1/02 |
| | | | | 254/8 R |

(Continued)

FOREIGN PATENT DOCUMENTS

DE    20 2006 001 376 U1    7/2007

OTHER PUBLICATIONS

Italian Search Report for IT 201700090844 dated Apr. 13, 2018, pp. 1-8.

(Continued)

*Primary Examiner* — Gregory W Adams
(74) *Attorney, Agent, or Firm* — McDonnell Boehnen Hulbert & Berghoff LLP (57) ABSTRACT

An apparatus including a storage tank, a frame positioned at least partially beneath the storage tank, a lever having a first end and a second end pivotally mounted to the frame, a scale system positioned beneath the storage tank, wherein in a first position, the storage tank exerts a force against the scale system, and in a second position, the second end of the lever exerts a force on a bottom of the storage tank such that the storage tank is positioned above, and out of contact with, the scale system.

21 Claims, 13 Drawing Sheets

(56) References Cited

U.S. PATENT DOCUMENTS

| | | | |
|---|---|---|---|
| 4,878,356 A | 11/1989 | Punches et al. | |
| 5,125,626 A * | 6/1992 | Lonsway | B62B 3/0625 |
| | | | 254/8 R |
| 5,739,478 A * | 4/1998 | Zefira | G01G 19/083 |
| | | | 177/130 |
| 6,119,475 A | 9/2000 | Murray et al. | |
| 6,124,554 A * | 9/2000 | Muckle | G01G 19/083 |
| | | | 177/126 |
| 6,680,442 B1 * | 1/2004 | Rynd | G01G 19/445 |
| | | | 177/140 |
| 8,602,713 B1 * | 12/2013 | Davis | B60P 1/025 |
| | | | 414/589 |
| 2009/0145143 A1 | 6/2009 | McMasters | |
| 2014/0144714 A1 | 5/2014 | Kjar | |
| 2014/0245809 A1 * | 9/2014 | Muelich | G01G 21/26 |
| | | | 73/1.13 |
| 2015/0231583 A1 * | 8/2015 | Maguire | G01G 19/24 |
| | | | 366/141 |

OTHER PUBLICATIONS

European Search Report, European Patent Application No. 18187292.0, dated Dec. 4, 2018, 8 pages.

* cited by examiner

APPARATUS AND METHOD FOR LOCKING A STORAGE TANK ABOVE A SCALE DURING TRANSPORTATION

BACKGROUND

This application claims priority to Italian Application No. IT 102017000090844 entitled "Apparatus and Method for Locking a Storage Tank Above a Scale During Transportation," filed on Aug. 4, 2017, the entire contents of which are incorporated by reference herein in their entirety.

Many vehicles come equipped with systems that utilize refrigerants, such as air conditioning systems, for example. The refrigerant (1,1,1,2-tetrafluoroethane-R-134a, for example) contained within such systems may need to be supplemented, recycled, or removed on occasion. In order to remove or add the refrigerant, refrigerant recovery and delivery units can be used. To meet certain recovery standards, or to add refrigerant, such refrigerant recovery and delivery units can measure an amount of refrigerant that has been removed from or added to a vehicle.

Refrigerant recovery and delivery units can be equipped with a storage tank for storing refrigerant. In order to determine the amount of refrigerant that has been removed from or added to the vehicle, the storage tank and any contents thereof may be weighed to determine the mass of refrigerant within the storage tank using a scale system that measure the weight of the storage tank and its contents. In some cases, the storage tanks and scale systems can be prone to vibration or movement during transportation of the refrigerant recovery and delivery unit from one location to another. In addition, if the vehicle transporting the storage tank and scale system within the refrigerant recovery and delivery system encounters a bumpy ride, the storage tank and scale system can be jostled or experience jolts. These conditions can lead to damage inflicted on the scale system. For example, under these conditions, the storage tank can impact a load cell within the scale system, thereby damaging the load cell.

Accordingly, it would be desirable to provide a system that helps to prevent damage to the scale system when the refrigerant recovery and delivery unit is being transported from one location to another.

SUMMARY

The present disclosure provides an apparatus for lifting a storage tank of a refrigerant recovery and delivery unit above and out of contact with a scale system, to prevent damage to the scale system from vibration, movement, jostling, or jolting, that may occur during transportation of the refrigerant recovery and delivery unit from one location to another. A hand-operated cam element may be used to move a lever from a normally unlocked position where the storage tank is in contact with the scale system, to a locked position where an end of the lever exerts a force on a bottom of the storage tank to move the storage tank into a locked position where the storage tank is positioned above, and out of contact with, the scale system. In this manner, the scale system is not subject to damage during transportation of the refrigerant recovery and delivery unit from one location to another when in the locked position out of contact with the scale system.

The present disclosure further provides for a method of lifting a storage tank of a refrigerant recovery and delivery unit above and out of contact with a scale system, to prevent damage to the scale system from vibration, movement, jostling, or jolting, that may occur during transportation of the refrigerant recovery and delivery unit from one location to another. The method includes turning a hand-operated cam element to move a lever from a normally unlocked position where the storage tank is in contact with the scale system, to a locked position where an end of the lever exerts a force on a bottom of the storage tank to move the storage tank into a locked position where the storage tank is positioned above, and out of contact with, the scale system. In this manner, the method provides that the scale system is not subject to damage during transportation of the refrigerant recovery and delivery unit from one location to another when it has been moved to the locked position with the storage tank out of contact with the scale system.

In one aspect, a refrigerant recovery and delivery unit is provided having a storage tank, a frame positioned at least partially beneath the storage tank, a lever having a first end and a second end pivotally mounted to the frame, a scale system positioned beneath the storage tank, wherein in a first position, the storage tank exerts a force against the scale system, and in a second position, the second end of the lever exerts a force on a bottom of the storage tank such that the storage tank is positioned above, and out of contact with, the scale system.

In another aspect, a refrigerant recovery and delivery unit is provided having a storage tank, a frame positioned at least partially beneath the storage tank, a scale system positioned beneath the storage tank, means for moving the storage tank from a first position where the storage tank exerts a force against the scale system to a second position where the storage tank is positioned above, and out of contact with, the scale system.

Viewed from another aspect, an example embodiment takes the form of a method. The method includes steps of (i) providing a storage tank, a frame positioned at least partially beneath the storage tank, a scale system positioned beneath the storage tank, and means for moving the storage tank from a first position where the storage tank exerts a force against the scale system to a second position where the storage tank is positioned above, and out of contact with, the scale system; and (ii) moving the storage tank from the first position wherein the storage tank exerts a force on the scale system to the second position where the storage tank is positioned above, and out of contact with, the scale system.

These as well as other aspects and advantages will become apparent to those of ordinary skill in the art by reading the following detailed description, with reference to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the following drawings.

DETAILED DESCRIPTION

In this description, the articles "a," "an," and "the" are used to introduce elements and/or functions of the example embodiments. The intent of using those articles is that there is one or more of the introduced elements and/or functions. In this description, the intent of using the term "and/or" within a list of at least two elements or functions and the intent of using the terms "at least one of" and "one or more of" immediately preceding a list of at least two elements or functions is to cover each embodiment including a listed element or function independently and each embodiment comprising a combination of the listed elements or functions. For example, an embodiment described as comprising "A, B, and/or C," or "at least one of A, B, and C," or "one or more of A, B, and C" is intended to cover each of the following possible embodiments: (i) an embodiment comprising A, but not B and C, (ii) an embodiment comprising B, but not A and C, (iii) an embodiment comprising C, but not A and B, (iv) an embodiment comprising A and B, but not C, (v) an embodiment comprising A and C, but not B, (v) an embodiment comprising B and C, but not A, and (vi) an embodiment comprising A, B, and C. For the embodiments comprising element or function A, the embodiments can comprise one A or multiple A. For the embodiments comprising element or function B, the embodiments can comprise one B or multiple B. For the embodiments comprising element or function C, the embodiments can comprise one C or multiple C. In this description, the use of ordinal numbers such as "first," "second," "third" and so on is to distinguish respective elements rather than to denote a particular order of those elements unless the context of using those terms explicitly indicates otherwise.

The diagrams, flow charts, and data shown in the figures are provided merely as examples and are not intended to be limiting. Many of the elements illustrated in the figures and/or described herein are functional elements that can be implemented as discrete or distributed elements, individually or in conjunction with other element(s), and in any suitable combination and/or location. Those skilled in the art will appreciate that other arrangements and elements can be used instead. Furthermore, the functions described as being performed by one or more elements can be carried out by a combination of hardware, firmware, and/or software (e.g., a processor that executes computer-readable program instructions).

Figure 1:
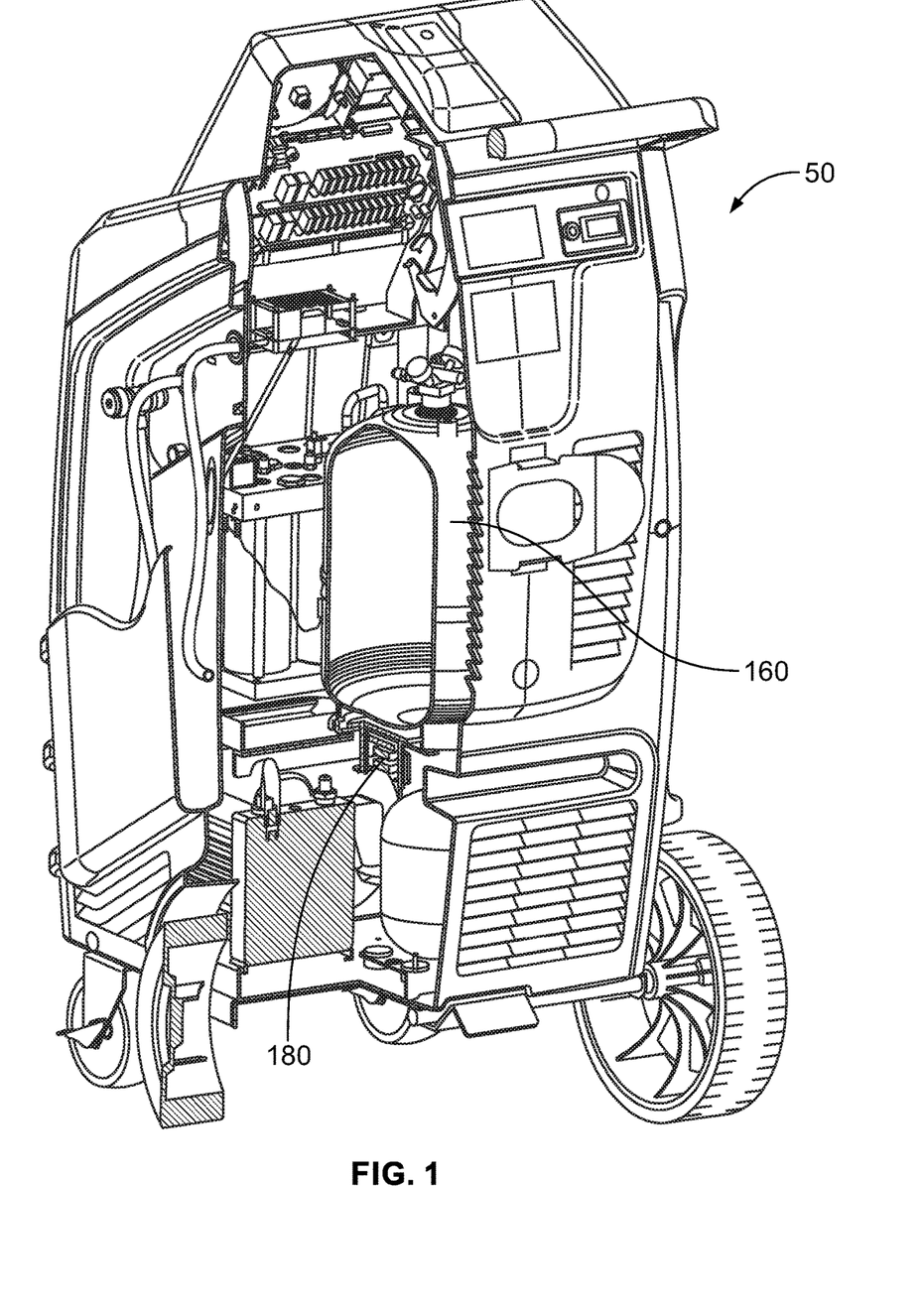
FIG. 1 is a partial cut-away perspective view of refrigerant recovery and delivery unit 50 having a storage tank positioned on top of a scale system.

FIG. 1 is a partially cut-away perspective view showing an apparatus 50, which in some embodiments may be a refrigerant recovery and delivery unit. In this embodiment, storage tank 160 is positioned within the refrigerant recovery and delivery unit 50. The apparatus 50 can be configured to weigh a storage tank 160 and contents thereof, using a scale system 180, which may be a load cell, although other types of scales may also be used.

In some cases, the storage tank 160 and scale system 180 can be prone to vibration or movement during transportation of the refrigerant recovery and delivery unit from one location to another. In addition, if the vehicle transporting the storage tank and scale system within the refrigerant recovery and delivery system encounters a bumpy ride, the storage tank and scale system can be jostled or experience jolts. These conditions can lead to damage inflicted on the scale system. For example, under these conditions, the storage tank can impact a load cell within the scale system, thereby damaging the load cell.

Figure 2:
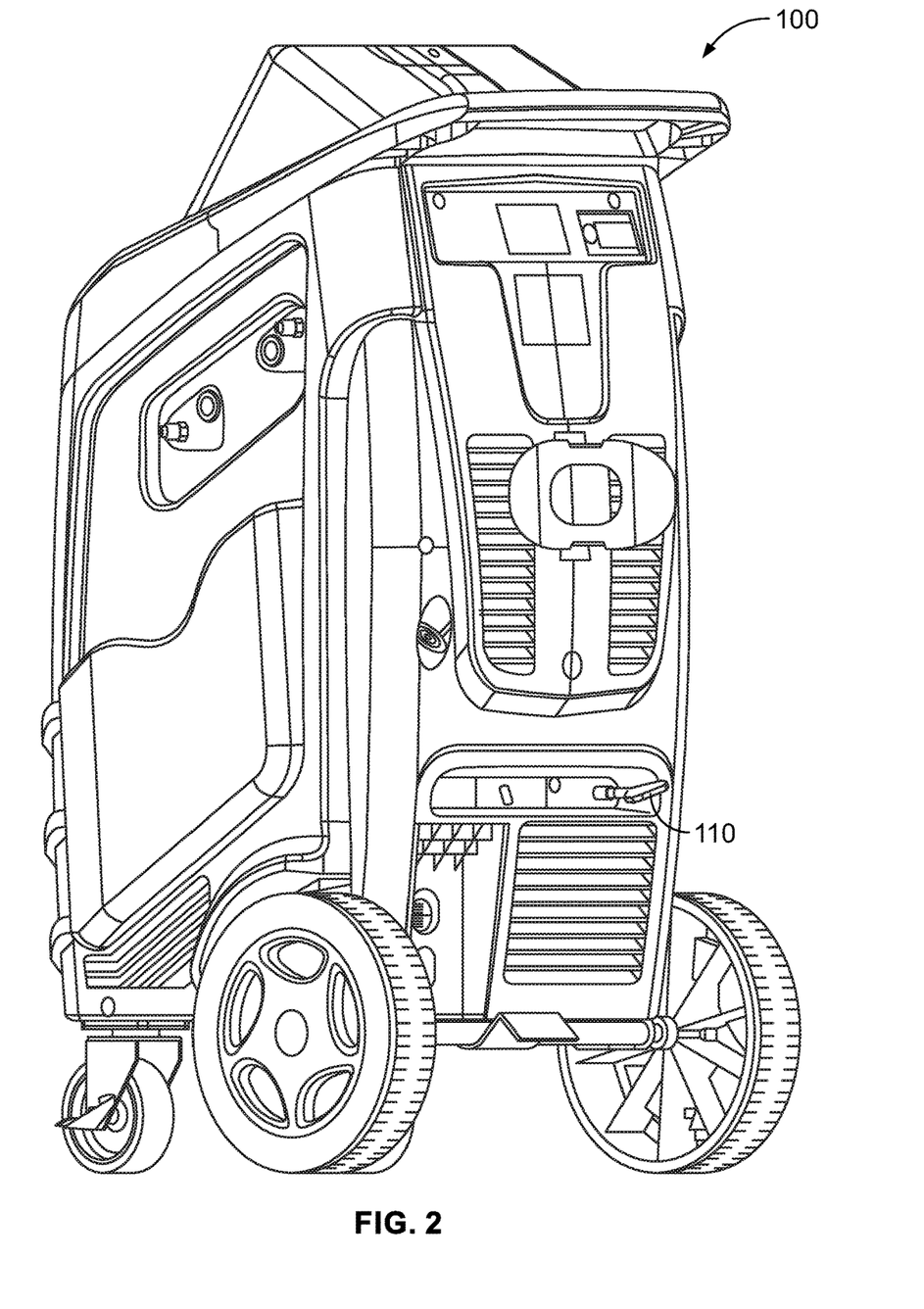
FIG. 2 is a perspective view of refrigerant recovery and delivery unit 100, according to an example embodiment.

FIG. 2 is a perspective view of refrigerant recovery and delivery unit 100. In this embodiment, an external handle 110 is provided. Upon rotation of the handle 110, a mechanism is used to move the storage tank within from an unlocked position in which the storage tank exerts a force on a scale system, to a locked position in which the storage tank is moved above, and out of contact with, the scale system. In this manner, during transportation when the refrigerant recovery and delivery unit 100 experiences a bumpy ride, vibration, jostling, and/or jolting, etc., with the storage tank 160 in the locked position, the storage tank 160 is positioned above, and out of contact with, the scale system 180, thereby preventing damage to the scale system 180 during transportation.

Figure 3:
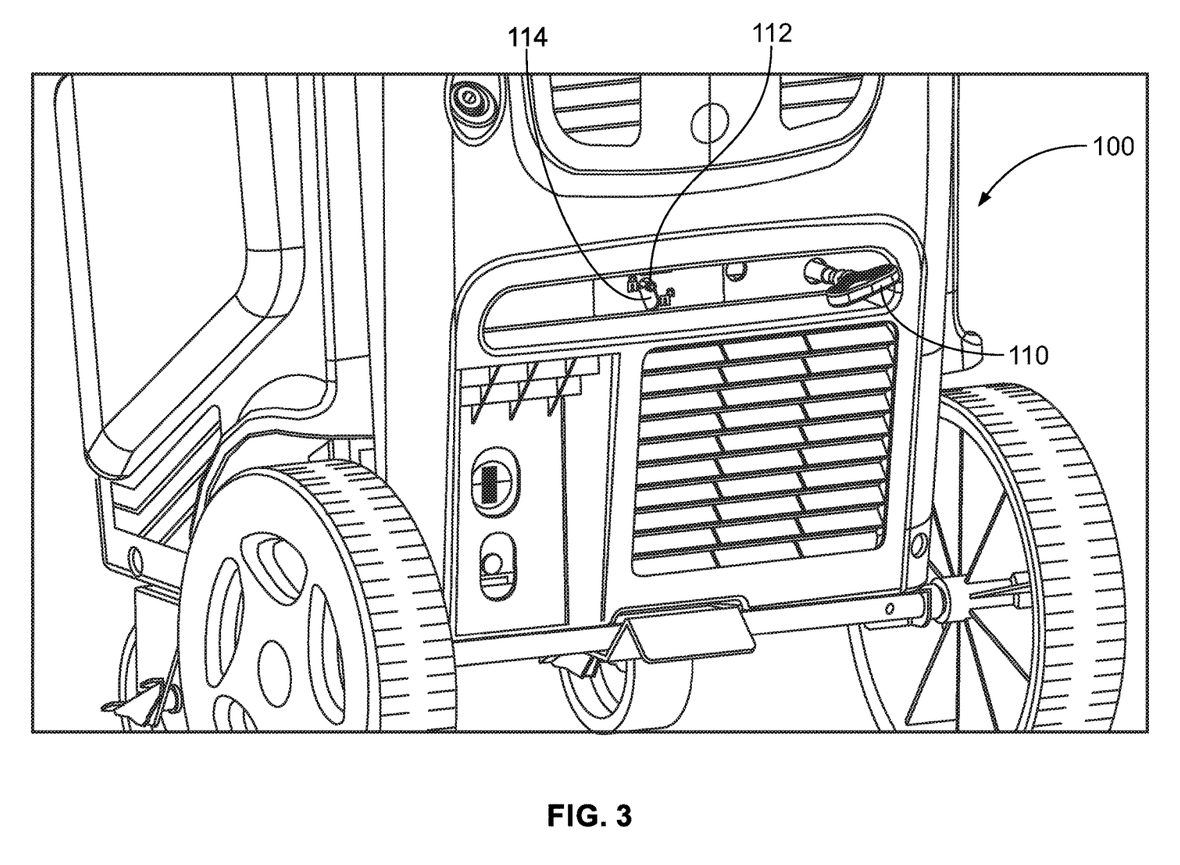
FIG. 3 is a perspective view of refrigerant recovery and delivery unit 100 shown in FIG. 2 having a handle 110 movable from moving a storage tank within from an unlocked to a locked position, with the handle shown in the locked position, according to an example embodiment.

FIG. 3 is a close-up perspective view of the refrigerant recovery and delivery unit 100 shown in FIG. 2. In FIG. 3, the handle 110 is shown in the locked position. An indicator 112 extends through a slot 114 to provide an indication as to whether the storage tank within is in the locked position, with the storage tank positioned above, and out of contact with, the scale system, during transportation, or in the unlocked position with the storage tank exerting a force against the scale system during normal operation, and not during transport.

Figure 4A:
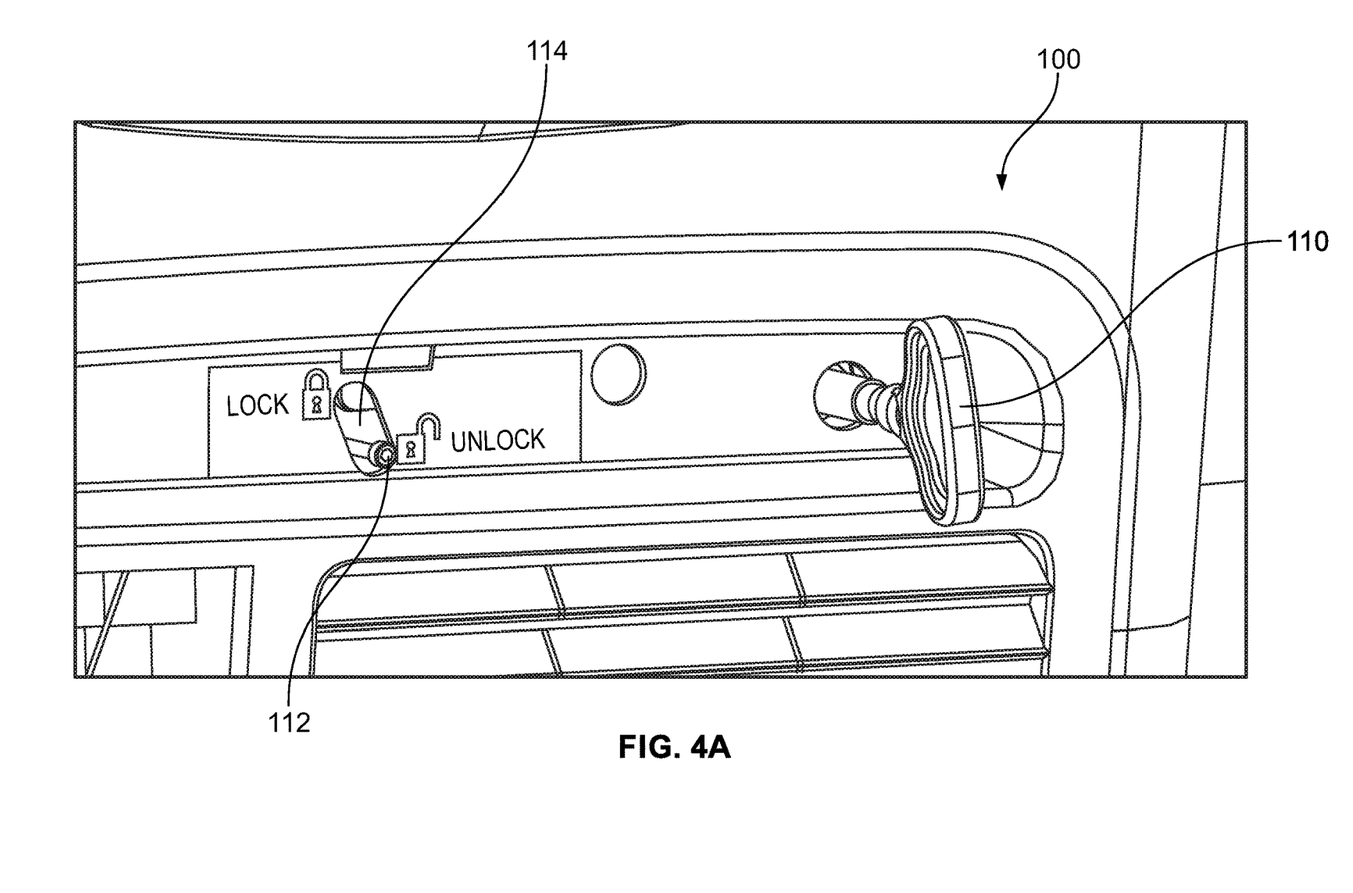
FIG. 4A is a close up perspective view of refrigerant recovery and delivery unit 100 shown in FIGS. 2 and 3 shown with the handle 110 in an unlocked position, according to an example embodiment.

FIG. 4A is a close-up view of refrigerant recovery and delivery unit 100 shown with handle 110 in the unlocked position. Indicator 112 extends through slot 114 indicating that the handle 110 and storage tank within is in the unlocked position with the storage tank exerting a force against the scale system, during normal operation, and not during transport.

Figure 4B:
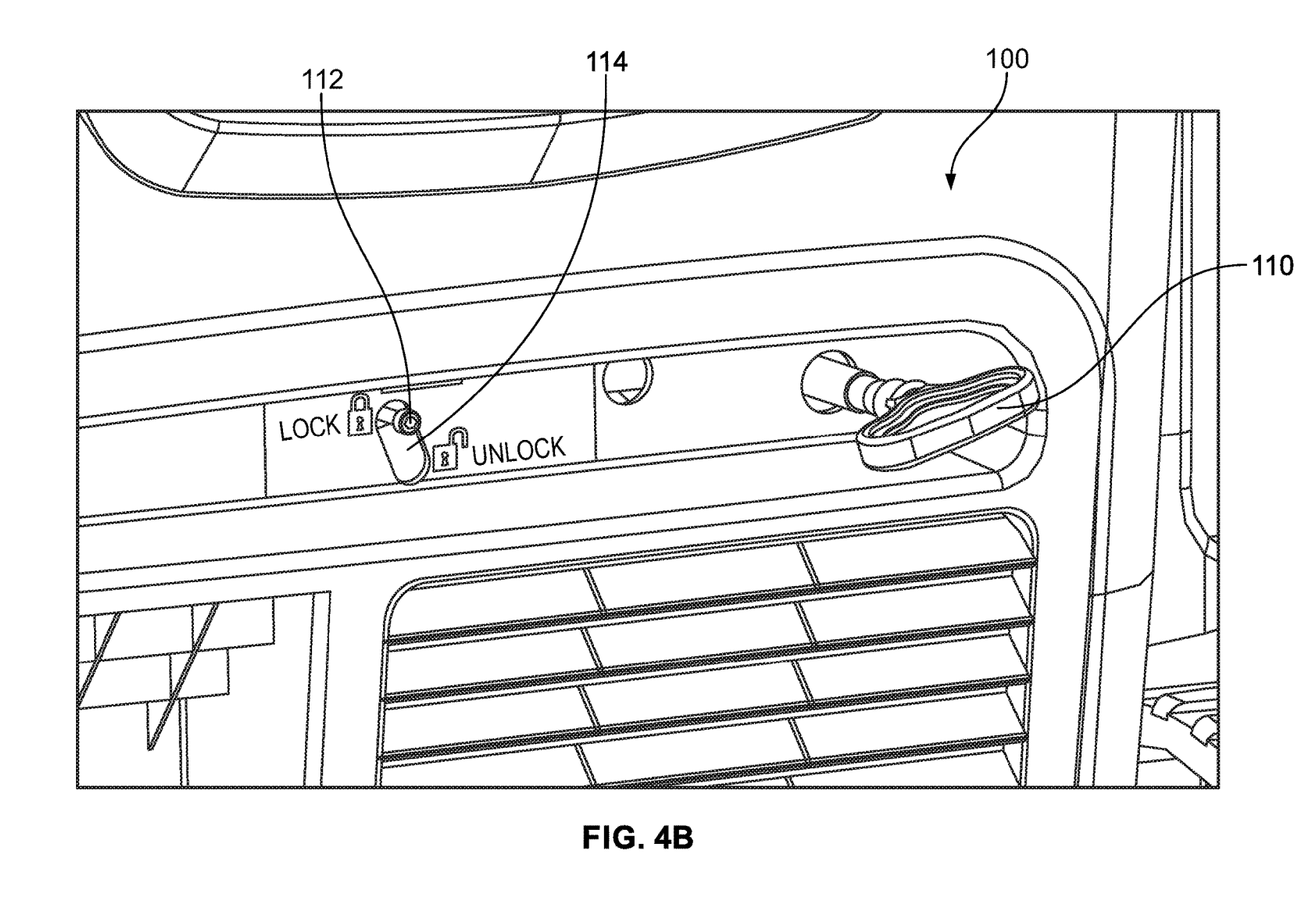
FIG. 4B is a close up perspective view of refrigerant recovery and delivery unit 100 shown in FIGS. 2 and 3 with handle 110 shown in a locked position, according to an example embodiment.

FIG. 4B is a close-up view of refrigerant recovery and delivery unit 100 after handle 110 has been moved 90 degrees such that the storage tank is positioned in the locked position, above, and out of contact with, the scale system. In FIG. 4B, the indicator 112 extends through slot 114 to indicate that the handle 110 and storage tank within is in the locked positioned. In other embodiments, the handle 110 may be turned less than, or more than 90 degrees to move from an unlocked position to a locked position, or vice versa.

Figure 5:
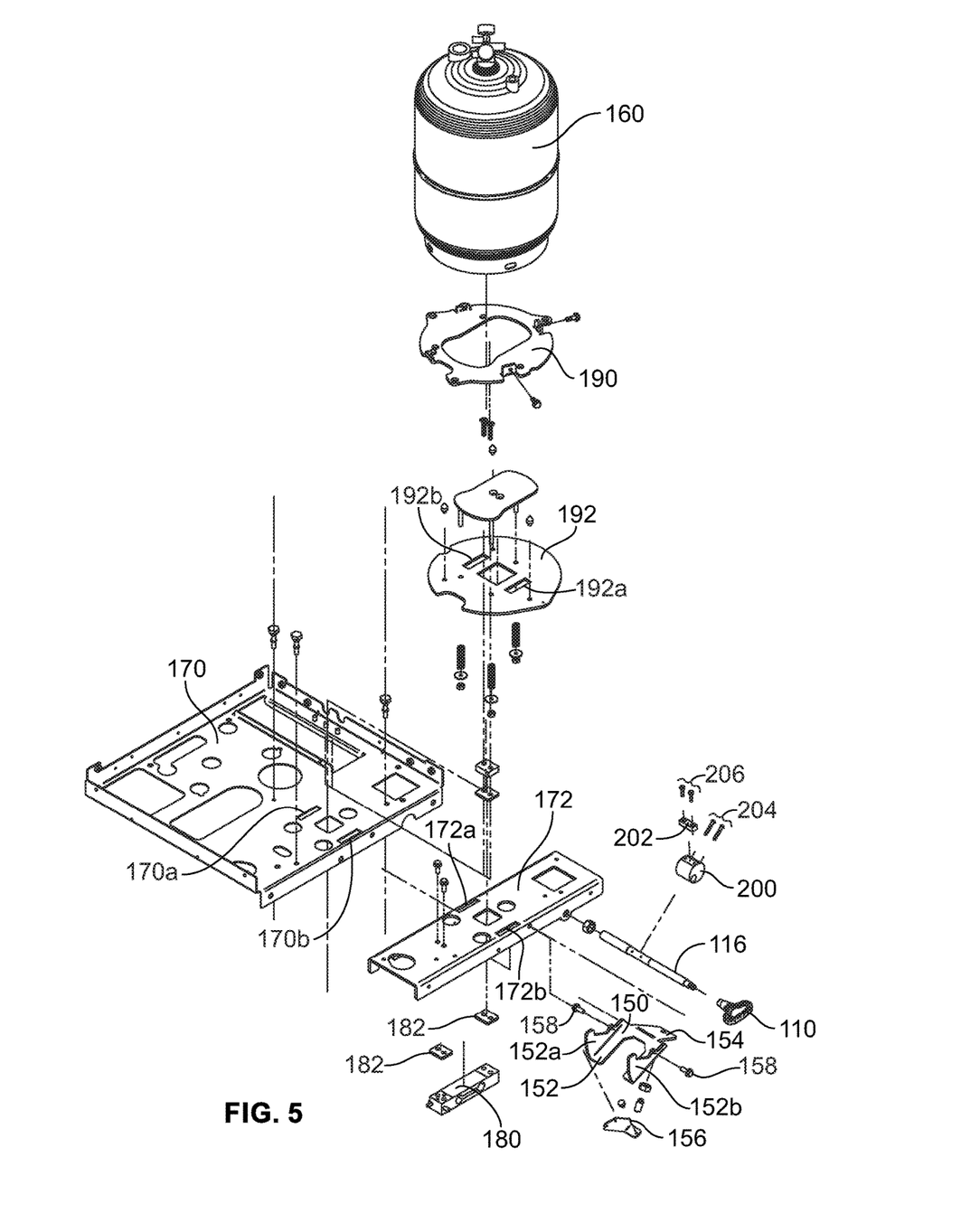
FIG. 5 is an exploded view of the components of the refrigerant recovery and delivery unit 100 shown in FIGS. 2-4B.

FIG. 5 is an exploded view of the internal components of refrigerant recovery and delivery unit 100 shown in FIGS. 2-4B. The internal components include storage tank 160. In some embodiments, the storage tank 160 can be configured to store refrigerant, such as refrigerant used in air-conditioning systems in vehicles (e.g., industry standard refrigerants like dichlorodifluoromethane-R-12, chlorodifluoromethane-R-22, 1,1,1,2-tetrafluoroethane-R-134a, etc.), in some embodiments. The refrigerant stored within the storage tank 160 can be a liquid, a gas, or a combination of the two, in various embodiments. In one example embodiment, the storage tank 160 has a 30 lb. (13.6 kg) rated refrigerant capacity. The storage tank 160, when empty, can have a weight between 15-17 lb. (6.8-7.7 kg) In another example embodiment, the storage tank 160 has a 50 lb. (22.7 kg) rated refrigerant capacity and an empty weight between 28-32 lb. (12.7-14.5 kg). Various other storage tank 160 sizes and capacities are possible (e.g., 24 lb., 10.9 kg, rated refrigerant capacity storage tank 160). In other embodiments, the storage tank 160 may store gas and/or liquid other than a refrigerant.

The refrigerant within the storage tank 160 can be stored during a refrigerant recovery process, a refrigerant recycling process, or a refrigerant reintroduction process, in various embodiments. Further, the refrigerant recovery process, recycling process, or reintroduction process can include multiple phases or stages (e.g., one phase that withdraws refrigerant from, or adds refrigerant to, a vehicle using a compressor and a second phase that withdraws refrigerant from a vehicle using a compressor aided by a vacuum pump). In addition, the storage tank 160 may also store refrigerant when not in use with respect to a vehicle.

A tank plate 190 is positioned beneath the bottom of the storage tank 160 and may be secured to the bottom of the storage tank via clips, set screws, strap(s), etc. A base plate 192 is positioned beneath the tank plate 190. The storage tank 160, tank plate 190, and base plate 192 are positioned above frame 170 which includes a frame reinforcement 172. A scale system 180 in the form of a load cell is positioned within the frame 170, and scale spacers 182 are also shown.

A handle 110 is attached to a lever shaft 116, which is in turn attached to cam 200 via pair of fasteners 204. A cam stop 202 is attached to cam 200 via fasteners 206. A lever 150 is also mounted for engagement with cam 200 and/or cam stop 202 of lever shaft 116. The lever 150 includes a first end 152 having upwardly extending flanges 152a and 152b that extend through slots 172a and 172b of frame reinforcement 172, as well as through slots 192a and 192b in base plate 192, and through slots 170a and 170b in frame 170. The upwardly extending flanges 152a and 152b on lever 150 engage a bottom of tank plate 190 when the handle 110 and lever shaft 116 are rotated, to lift storage tank 160 above, and out of contact with, scale system 180 when the storage tank is moved to the locked position. The lever 150 also includes a second end 154 which engages cam 200 and/or cam stop 202 when cam 200 is rotated by handle 110 and lever shaft 116. An end position magnet 156 is also provided to maintain the lever 150 in a desired unlocked position, and prevent an unwanted movement of the lever 150 when in the unlocked position. Pivot bolts 158 are used to pivotally mount lever 150 with frame enforcement 172. A single bolt could also be used.

Figure 6:
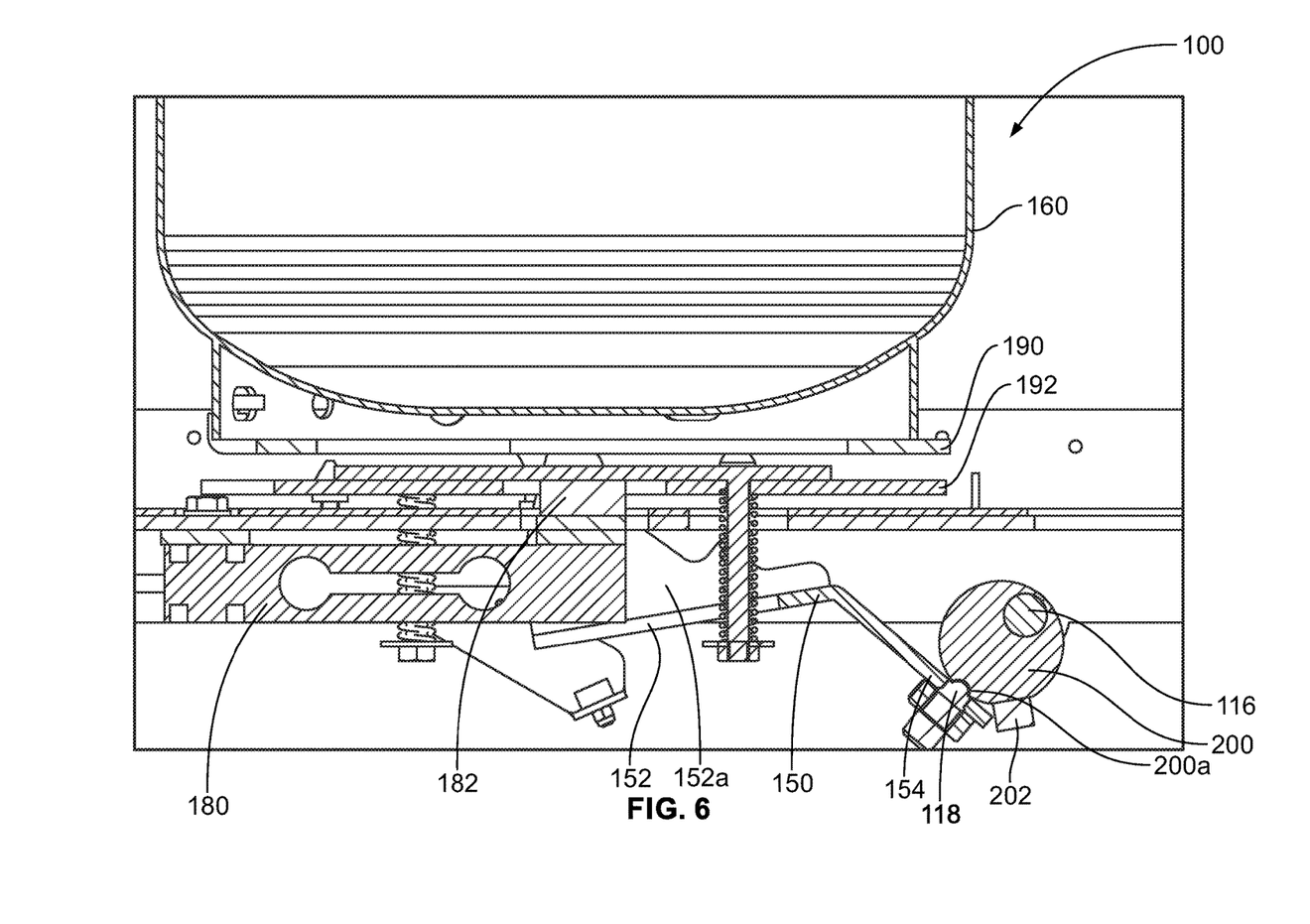
FIG. 6 is a cut-away view of a portion of refrigerant recovery and delivery unit 100 shown in FIGS. 2-5, shown with lever 150 in a locked position, according to an example embodiment.

FIG. 6 is a sectional view of refrigerant recovery and delivery unit 100 shown in FIGS. 2-5. In FIG. 6, the storage tank 160 is shown in the locked position with the tank plate 190 and storage tank 160 positioned above, and out of contact with, base plate 192, scale system spacer 182 and scale system 180. Scale system spacer 182 can be made of steel coated with zinc, in some embodiments. Alternatively, the scale system spacer 182 could be made of rubber or another cushioned material. In FIG. 6, cam 200 has been rotated into engagement with an upper surface of second end 154 of lever 150. To lock the cam 200 into proper position, cam 200 includes a recess 200a into which a detent 118 extending through second end 154 of lever 150 extends. In this position, the cam 200 exerts a force against the upper surface of second end 154 of lever 150 thereby upwardly moving first end 152 of lever 150. Upwardly extending flange 152a and 152b exert an upward force against the bottom of tank plate 190, and in turn the bottom of storage tank 160, to position the storage tank 160 and tank plate 190 above, and out of contact with, base plate 192, scale system spacer 182 and scale system 180. In this embodiment, the cam is secured to lever shaft 116 in an offset manner, such that cam 200, when rotated, exerts a force against the upper surface of the second end 154 of lever 150 to pivotally move lever 150. Further, in this embodiment the cam is shown with a generally circular cross section attached to the lever shaft 116 in an offset manner; however, in other embodiments, the cam 200 may have a different cross-section such as elliptical, parabolic, egg-shaped, etc. and may be secured to lever shaft 116 in a non-offset (or offset) manner. Cam 200 also is shown having a cam stop 202 that engages an outer end of the second end 154 of lever 150 to prevent further rotation of the cam 200, once it is in the locked position with detent 118 positioned within recess 200a of cam 200.

As noted above, in some embodiments scale system 180 may be a load cell, while in other embodiments the scale system could be a different type of scale such as a spring scale. When a load cell is used for scale system 180, the load cell is configured to measure force acting on the load cell. This force may be output as an electrical signal, in some embodiments. The electrical signal could be sent to a processing device or a control system, for example. Alternatively or additionally, the force could be output to a display for viewing by a user of the refrigerant recovery and delivery unit 100. The force measured by the load cell could correspond to the weight applied to the load cell by the storage tank 160 and contents therein. After accounting for the weight of an empty storage tank, the force measured by the load cell can correspond to the amount (weight) of refrigerant in the storage tank 160.

Various types of load cells may be used for scale system 180. Some example load cells include strain gauge load cells (e.g., shear beam load cells, double-ended shear beam load cells, or compression load cells), hydraulic load cells, and pneumatic load cells. The load cell can be a transducer in multiple embodiments, whereby a voltage or a current output signal indicates a value of a corresponding force acting on the load cell.

Figure 7:
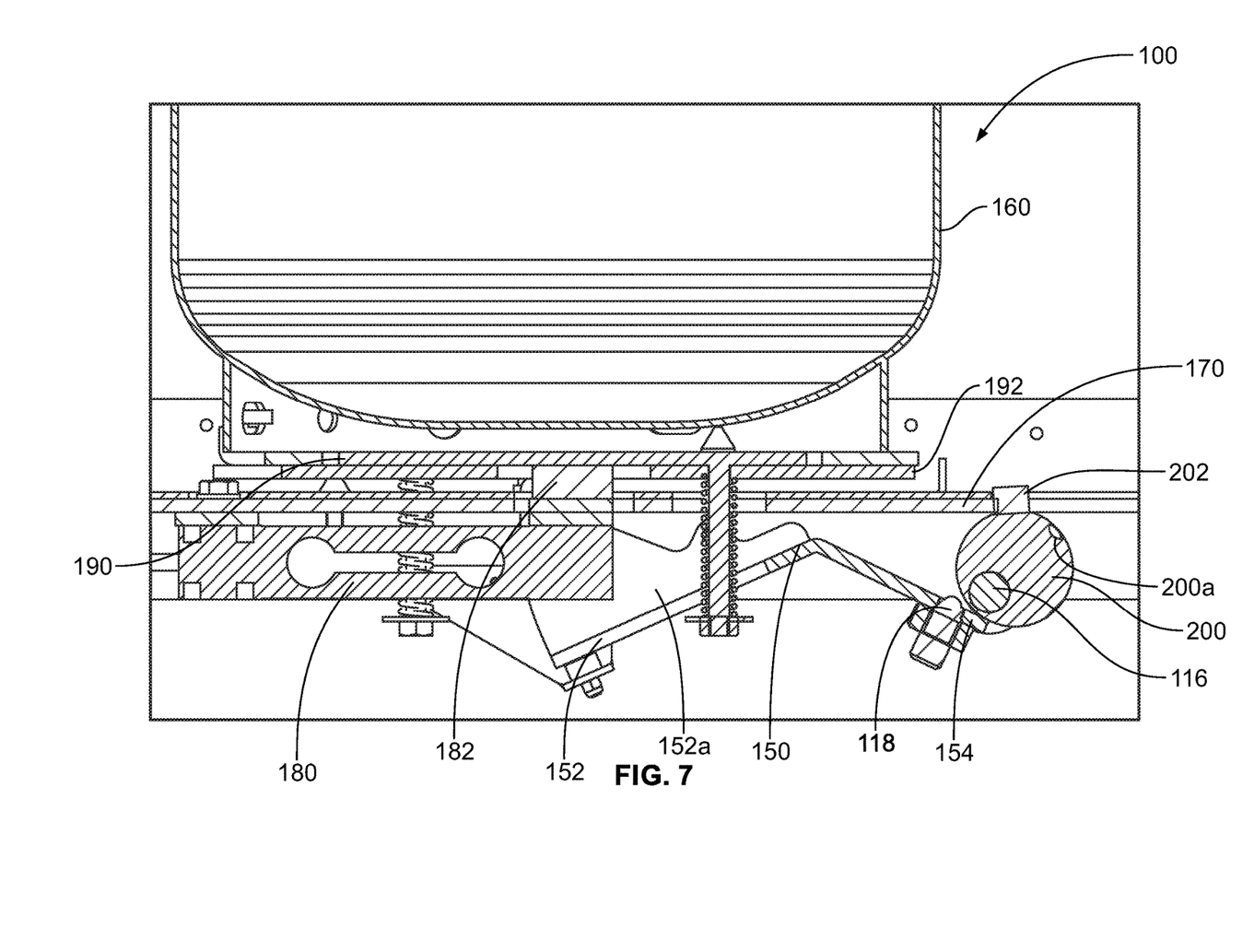
FIG. 7 is a cut-away view of a portion of refrigerant recovery and delivery unit 100 shown in FIGS. 2-5, shown with lever 150 in an unlocked position, according to an example embodiment.

FIG. 7 is a sectional view of refrigerant recovery and delivery unit 100 shown in FIGS. 2-6. In FIG. 7, the storage tank 160 is shown in the unlocked position with the tank plate 190 in contact with base plate 192, and exerting a force on scale system spacer 182 and scale system 180. Thus, in the unlocked position shown in FIG. 7, the scale system 180 can determine the weight of storage tank 160 and the contents thereof. The cam 200 has been rotated 90 degrees such that the detent 118 extending through second end 154 of lever 150 is no longer positioned within recess 200a on cam 200. Further upwardly extending flanges 152a and 152b attached to first end 152 of lever 150 have moved downwardly and out of contact with tank plate 190. In addition, cam stop 202 positioned on cam 200 abuts an outer end of frame 170 to prevent further rotation of cam 200, to insure cam 200 is in a desired position in this unlocked position.

Figure 8A:
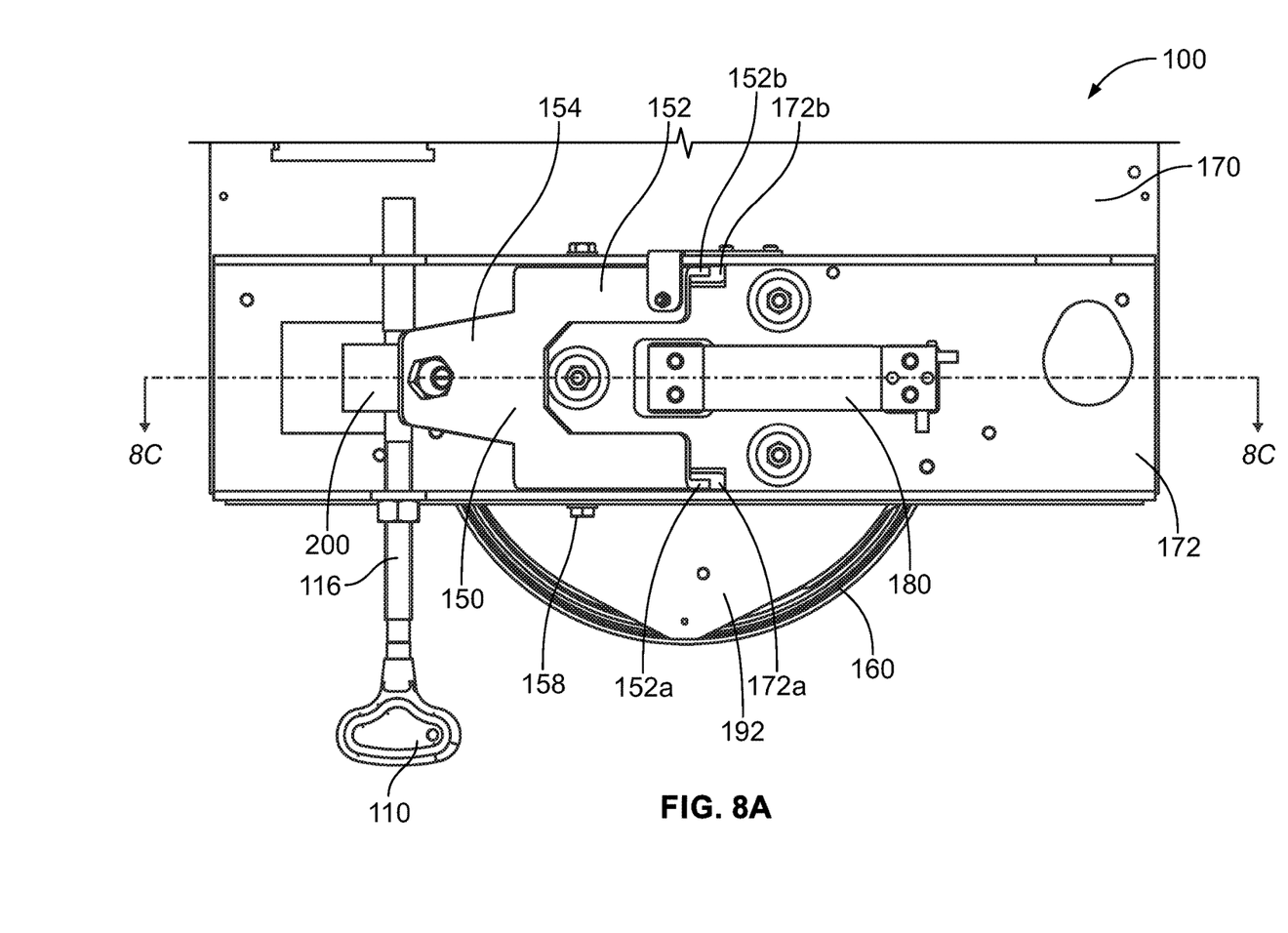
FIG. 8A is a bottom view of tank 160, lever 150, and frame 170 of refrigerant recovery and delivery unit 100 shown in FIGS. 2-7, shown with lever 150 in an unlocked position.

FIG. 8A is a bottom view of refrigerant recovery and delivery unit 100. Handle 110 and lever shaft 116 are shown extending through frame reinforcement 172 of frame 170, and cam 200 is shown secured to lever shaft 116. Lever 150 having a second end 154 and a first end 152 is shown pivotally mounted to frame reinforcement 172 of frame 170 with pivot bolt 158. Upwardly extending flanges 152a and 152b are shown extending through slots 172a and 172b of frame reinforcement 172, respectively. Slots 172a and 172b allow for movement of upwardly extending flanges 152a and 152b from an unlocked to a locked position, and vice versa. Storage tank 160 is shown extending above base plate 192. Scale system 180 shown as a load cell is shown positioned within frame reinforcement 172 of frame 170.

In some embodiments cam stop 202 may comprise a cam plate that when in the locked position extends over a top surface of second end 154 of lever 150 and exerts a force on the top surface of second end 154 to move the upwardly extending flanges 152a and 152b on first end 152 of lever 150 into engagement with tank plate 190 to move the tank plate 190 and storage tank 160 above, and out of contact with, base plate 192 and scale system 180.

Figure 8B:
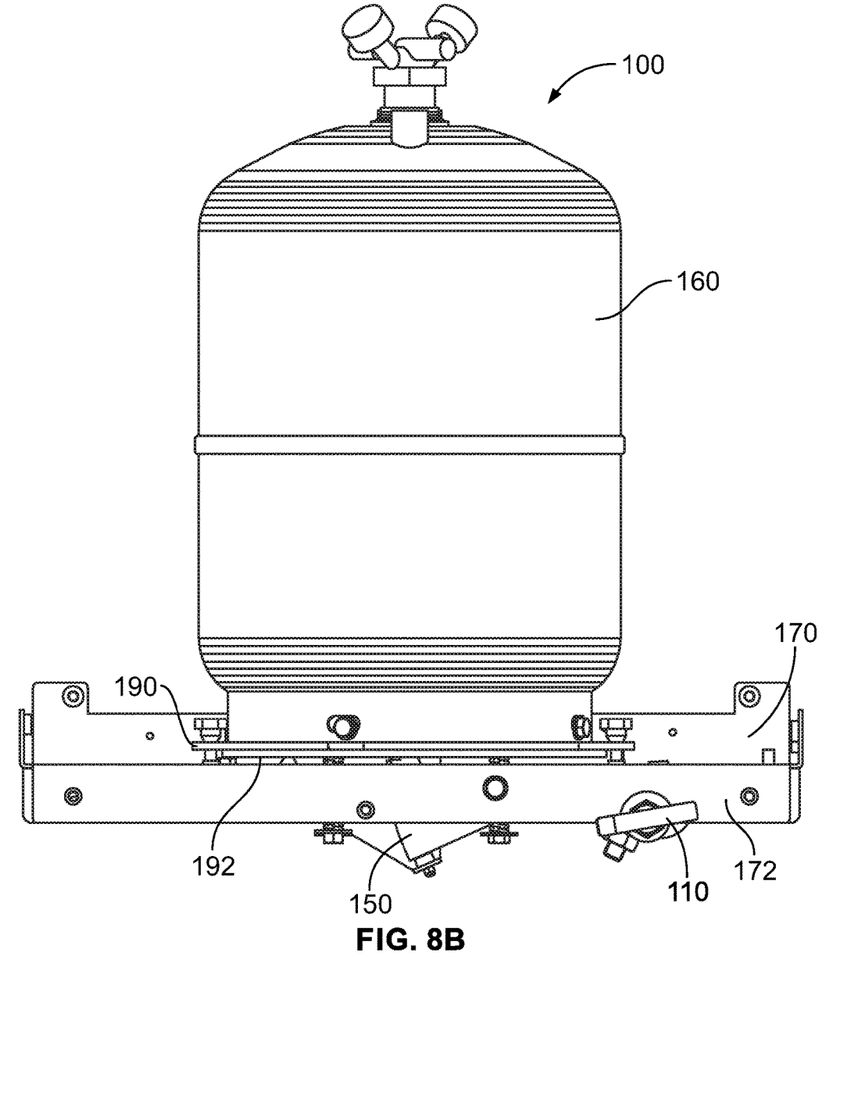
FIG. 8B is a cut-away side view of tank 160, lever 150 and frame 170 of refrigerant recovery and delivery unit 100 shown in FIG. 8A.

FIG. 8B is a side view of refrigerant recovery and delivery unit 100 with storage tank 160 positioned above frame 170 and frame reinforcement 172. In FIG. 8B handle 110 is shown in an unlocked position such that lever 150 does not exert an upward force against tank plate 190, and tank plate 190 is in contact with base plate 192 and exerts a force on scale system 180.

Figure 8C:
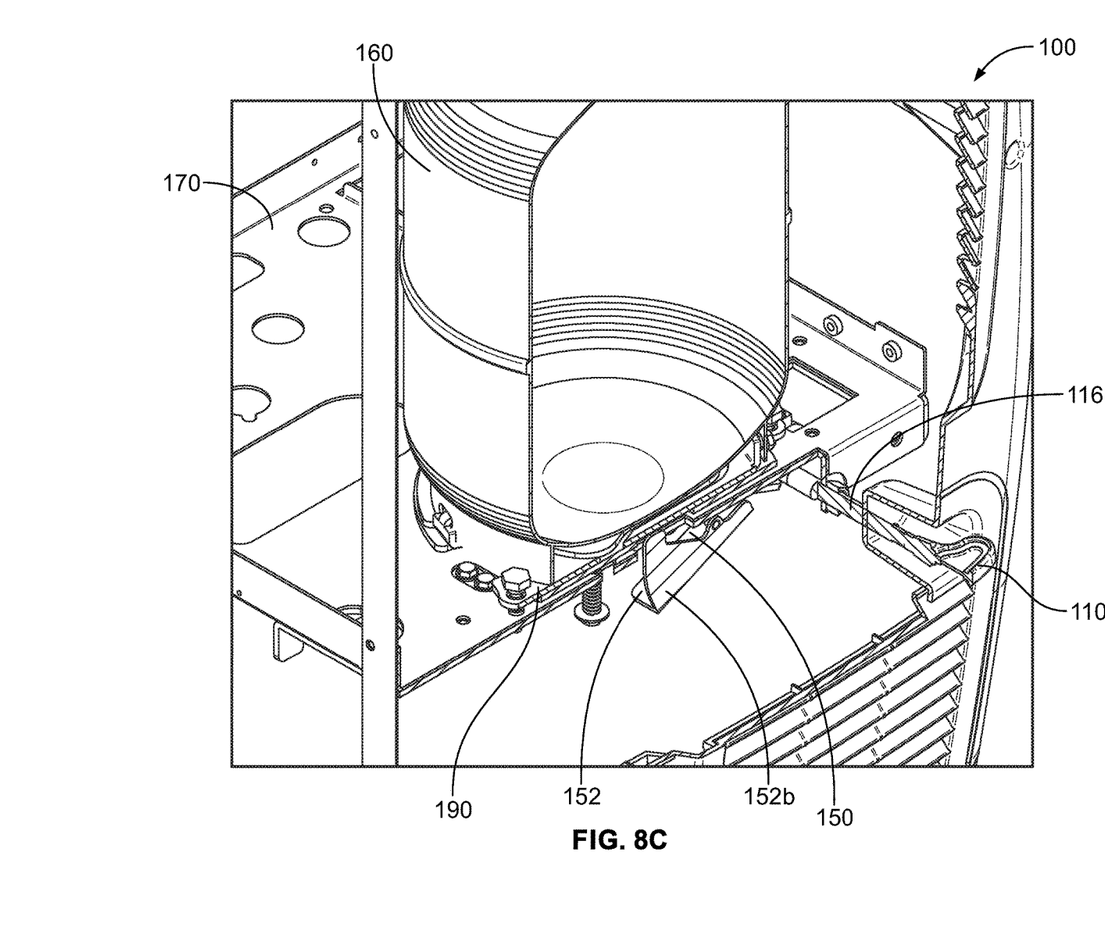
FIG. 8C is a cut-away perspective view of tank 160, lever 150, and frame 170 of refrigerant recovery and delivery unit 100 shown in FIGS. 8A and 8B.

FIG. 8C is a perspective cutaway view of refrigerant recovery and delivery unit 100 with storage tank 160 positioned above frame 170 and secured to tank plate 190. In FIG. 8C, handle 110 is shown in the unlocked position such that upwardly extends flanges 152a and 152b extending from first end 152 of lever 150 do not exert an upward force on the tank plate 190.

Figure 9A:
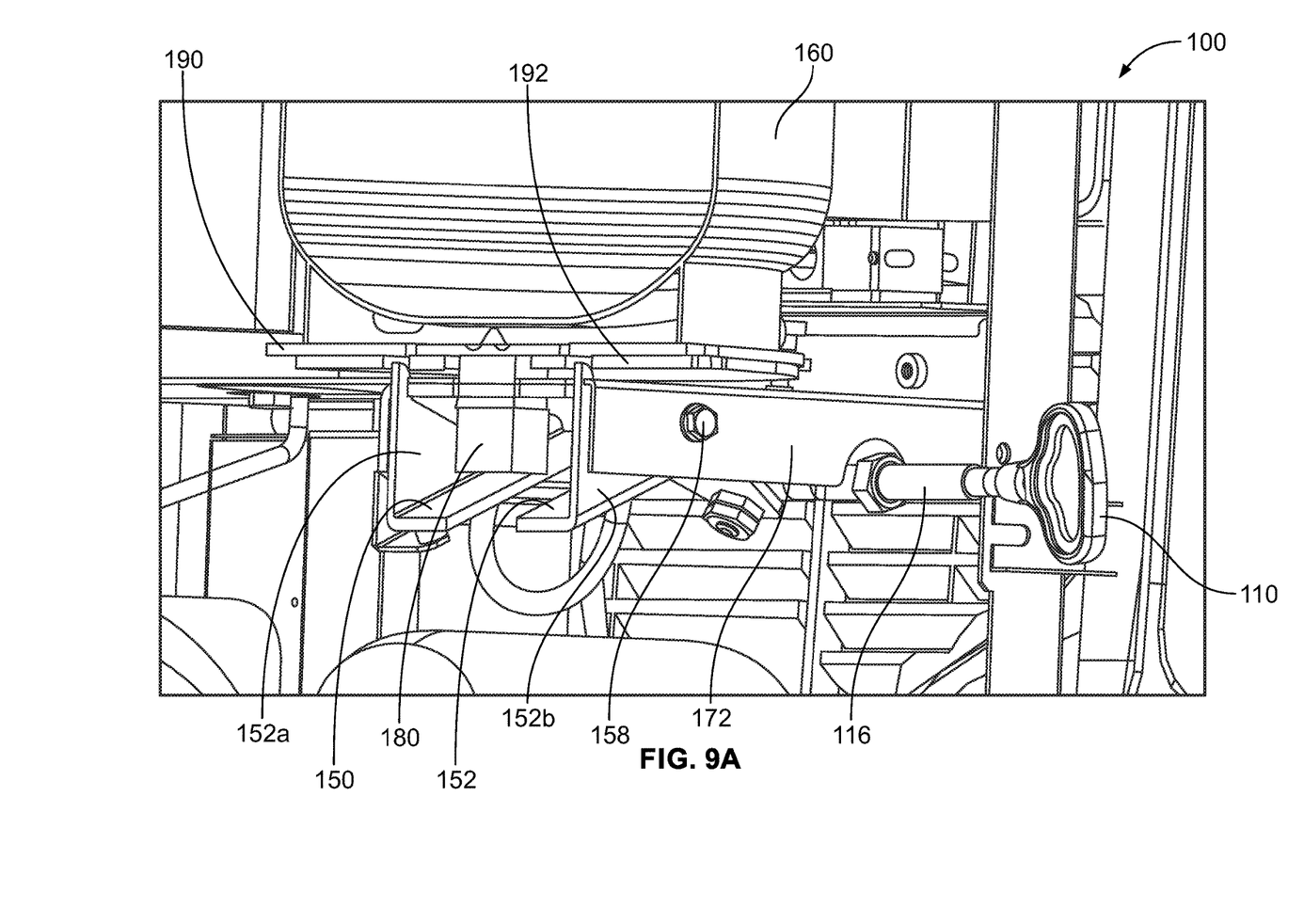
FIG. 9A is a close up, cutaway, perspective view of tank 160, lever 150, and frame 170, with the lever 150 shown in an unlocked position, with the tank 160 positioned on scale system 180.

FIG. 9A is a perspective cutaway view of refrigerant recovery and delivery unit 100, shown with handle 110 and lever shaft 116 in an unlocked position with storage tank 160 secured to tank plate 190, which is in contact with base plate 192 and exerts a force on scale system 180. Upwardly extending flanges 152a and 152b extending from first end 152 of lever 150 are out of contact with the tank plate 190. In addition, lever 150 is pivotally mounted to frame reinforcement 172 via pivot bolt 158.

Figure 9B:
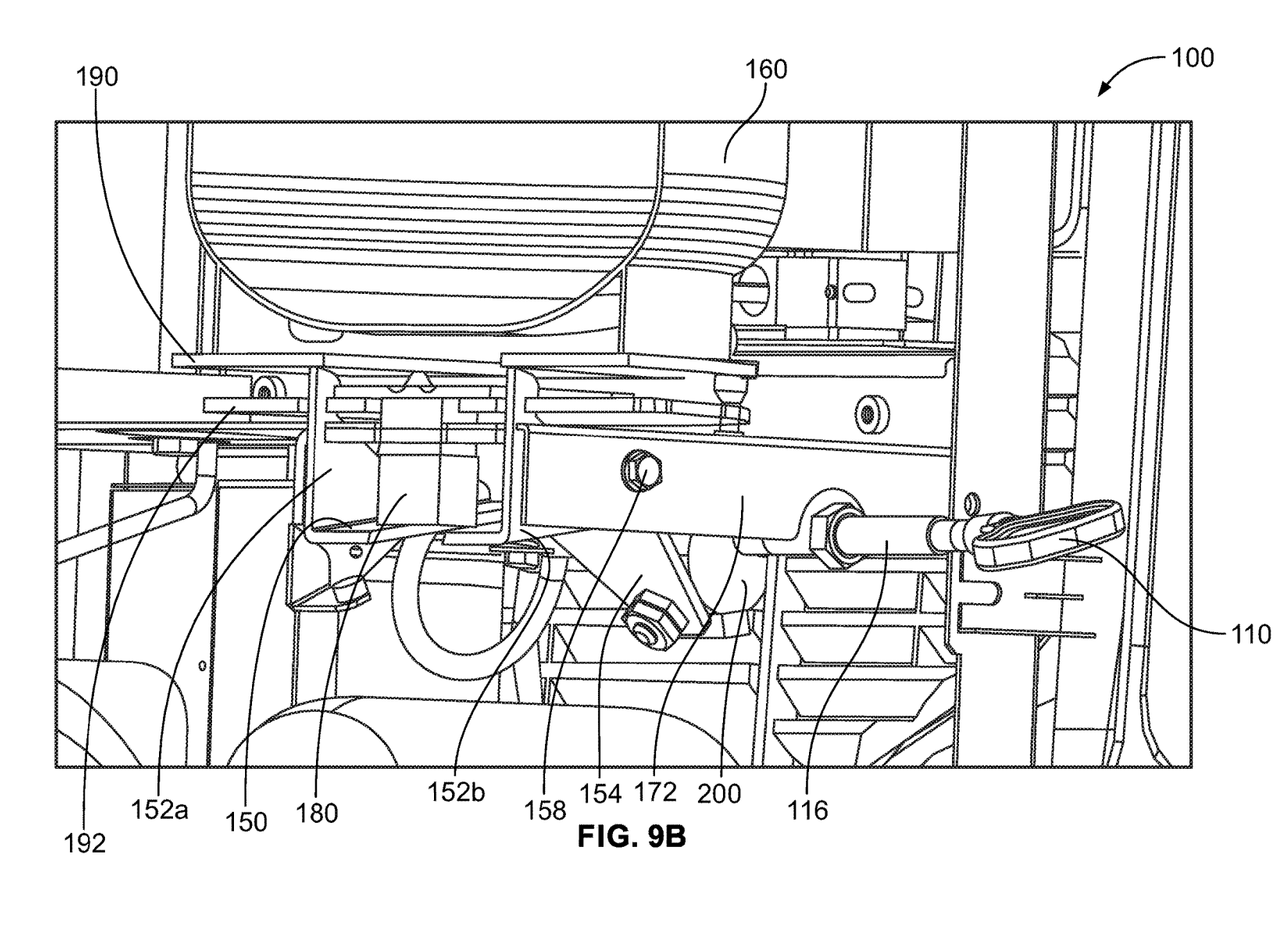
FIG. 9B is a close up, cutaway, perspective view of tank 160, lever 150, and frame 170, with the lever 150 shown in a locked position, with the tank 160 positioned above, and out of contact with, scale system 180.

FIG. 9B is a perspective cutaway view of refrigerant recovery and delivery unit 100 shown with handle 110 and lever shaft 116 in a locked position with storage tank 160 and tank plate 190 positioned above, and out of contact with, base plate 192 such that storage tank 160 and tank plate 190 do not exert a force on scale system 180. In this locked position, cam 200 exerts a force on a top surface of second end 154 of lever 150, which pivots about pivot bolt 158 positioned in frame reinforcement 172 such that flanges 152a and 152b extending from first end 152 of lever 150 exert a force on the bottom of tank plate 190, and in turn storage tank 160, such that tank plate 190 and storage tank 160 are positioned above, and out of contact with, base plate 192, and do not exert a force on scale system 180.

It will be appreciated that in some embodiments tank plate 190 is not required, and the first side 150 of the lever could exert a force directly on the bottom of storage tank 160, or a reinforced bottom of storage tank 160. In addition, in some embodiments, the lever 150 may include additional upwardly extending flanges like 152a and 152b, may include only a single flange like 152a and 152b, or may include no upwardly extending flanges at all.

Furthermore, other means may be used to raise the storage tank above, and out of contact with, the scale system 180. For example, a linear or rotary actuator, rack and pinion system, or cylinder may be used to exert a force on the bottom of storage tank 160 to move into a position above, and out of contact with, the scale system 180. Alternately, a pulley system may be employed that is secured to the top of the storage tank 160 to lift the tank above, and out of contact with, the scale system 180. Moreover, in some embodiments a base plate 192 may not be used. In addition, in the present embodiments a manually operated handle is illustrated attached to a lever shaft 116 to move cam 200. However, in other embodiments, a button or switch may be used to automatically operate electro-mechanical elements such as the linear or rotary actuators noted above to move the storage tank above, and out of contact with, the scale system 180.

As for the internal components of refrigerant recovery and delivery unit 100, the tank plate 190, base plate 192, frame 170, frame reinforcement 172, and lever 150 may comprise galvanized sheet metal, which in some cases may be ⅛ inch thick or more. Other materials may also be used. The handle 110 may be made of galvanized steel and the lever shaft 116 may be made of 35SMnPb10 steel, although other materials may be used. Cam 200 and cam stop 202 (also referred to as a cam plate) may be made of aluminum, although other materials may be used.

The base plate may be secured to frame 170 and/or frame reinforcement 172 with any suitable fastener such as bolts, and the frame reinforcement 172 of frame 170 may also be secured to frame 170 with any suitable fastener such as bolts.

In some embodiments, the storage tank 160 can also be detachable and/or interchangeable by a user of refrigerant recovery and delivery unit 100. Further, the storage tank 160 can include a level indicator that displays to a user of the refrigerant recovery and delivery unit 100 how much of the storage tank 160 is filled with fluid (e.g., in case the load cell of scale system 180 is not functioning properly) and/or when the storage tank 160 needs to be replaced/changed. Further, the storage tank 160 can include a temperature probe. The temperature probe could have an analog or digital display that is legible by users of the refrigerant recovery and delivery unit 100, in some embodiments. Additionally or alternatively, the temperature probe could transmit temperature measurements to a control system within the refrigerant recovery and delivery unit 100. The temperature within the storage tank 160 can indicate whether refrigerant within the storage tank 160 is in a gaseous or a liquid state.

Further, the storage tank 160 can have nozzle and/or hose attachments configured to attach the storage tank 160 to other components. For example, the storage tank 160 can be attachable to a vehicle or to other components within a refrigerant recovery and delivery unit. In some embodiments, the storage tank 160 will have a manometer attached to measure pressure within the storage tank 160.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein is for the purpose of describing particular embodiments only, and is not intended to be limiting.

What is claimed is:

1. An apparatus, comprising:
a storage tank;
a frame positioned at least partially beneath the storage tank;
a lever having a first end and a second end, the lever pivotally mounted to the frame; and
a scale positioned beneath the storage tank;
wherein in a first position, the storage tank exerts a force against the scale, and in a second position, the second end of the lever exerts a force on a bottom of the storage tank such that the storage tank is positioned above, and out of contact with, the scale;
wherein a cam attached to a lever shaft is rotatable to engage the first end of the lever to move the second end of the lever to exert a force on the bottom of the storage tank to move the storage tank from the first position to the second position.

2. The apparatus of claim 1, wherein the storage tank is configured to store refrigerant.

3. The apparatus of claim 1, wherein the scale is a load cell.

4. The apparatus of claim 1, wherein a tank plate is secured to the bottom of the storage tank, and in the second position, the second end of the lever exerts a force against a bottom surface of the tank plate.

5. The apparatus of claim 1, wherein the frame comprises a frame reinforcement, and the lever is pivotally mounted to the frame reinforcement.

6. The apparatus of claim 1, wherein a base plate is positioned above the frame.

7. The apparatus of claim 1, wherein the second end of the lever includes a pair of upwardly extending flanges adapted to exert a force against the bottom of the storage tank when the storage tank is in the second position.

8. The apparatus of claim 7, wherein exposed ends of the pair of upwardly extending flanges extend through slots in the frame when the storage tank is in the second position.

9. The apparatus of claim 8, wherein the exposed ends of the pair of upwardly extending flanges extend through a frame reinforcement that is part of the frame when the storage tank is in the second position.

10. The apparatus of claim 1, wherein the cam comprises a cylindrical member attached to a lever shaft that is offset from a centerline of the cylindrical member.

11. The apparatus of claim 1, wherein the cam includes a protuberance that engages the first end of the lever when the cam is rotated to move the storage tank from the first position to the second position.

12. The apparatus of claim 11, wherein the protuberance engages a portion of the frame to prevent further rotation of the cam when the storage tank is in the first position.

13. The apparatus of claim 1, wherein the cam includes a recess adapted to receive a protrusion extending from the first end of the lever to lock the cam into a locked positioned when the storage tank is in the second position.

14. An apparatus, comprising:
a storage tank;
a frame positioned at least partially beneath the storage tank;
a lever having a first end and a second end pivotally mounted to the frame; and
a scale positioned beneath the storage tank;
wherein in a first position, the storage tank exerts a force against the scale, and in a second position, the second end of the lever exerts a force on a bottom of the storage tank such that the storage tank is positioned above, and out of contact with, the scale;
wherein a cam attached to a lever shaft is rotatable to engage the first end of the lever to move the storage tank from the first position to the second position; and
wherein the cam is rotatable by a user operated handle attached to the lever shaft.

15. A method, comprising:
providing a storage tank, a frame positioned at least partially beneath the storage tank, a lever having a first end and a second end, the lever pivotally mounted to the frame, a cam attached to a lever shaft, a scale positioned beneath the storage tank; and
moving the storage tank from a first position wherein the storage tank exerts a force on the scale to a second position where the storage tank is positioned above, and out of contact with, the scale;
wherein the step of moving the storage tank from the first position to the second position comprises the step of rotating the cam attached to the lever shaft against the first end of the lever such that the second end of the lever exerts a force against a bottom surface of the storage tank to lift the storage tank above, and out of contact with, the scale.

16. The method of claim 15, wherein the scale is a load cell.

17. The method of claim 15, wherein the second end of the lever includes a pair of upwardly extending flanges adapted to exert a force against the bottom surface of the storage tank when the storage tank is in the second position.

18. The method of claim 15, wherein the cam comprises a cylindrical member attached to a lever shaft that is offset from a centerline of the cylindrical member.

19. The method of claim 15, wherein the cam includes a protuberance that engages the first end of the lever when the cam is rotated to move the storage tank from the first position to the second position.

20. The method of claim 19, wherein the protuberance engages a portion of the frame to prevent further rotation of the cam when the storage tank is in the first position.

21. The method of claim 15, wherein the cam includes a recess adapted to receive a protrusion extending from the first end of the lever to lock the cam into a locked positioned when the storage tank is in the second position.

* * * * *